United States Patent
Khan

(10) Patent No.: US 10,946,880 B2
(45) Date of Patent: Mar. 16, 2021

(54) METHOD AND SYSTEM FOR TRAIN ROUTE OPTIMIZATION

(71) Applicant: Siemens Mobility, Inc., New York, NY (US)

(72) Inventor: Badar K. Khan, Kingston, NY (US)

(73) Assignee: Siemens Mobility, Inc., New York, NY (US)

( * ) Notice: Subject to any disclaimer, the term of this patent is extended or adjusted under 35 U.S.C. 154(b) by 120 days.

(21) Appl. No.: 16/308,771

(22) PCT Filed: May 15, 2017

(86) PCT No.: PCT/US2017/032581
§ 371 (c)(1),
(2) Date: Dec. 11, 2018

(87) PCT Pub. No.: WO2017/218112
PCT Pub. Date: Dec. 21, 2017

(65) Prior Publication Data
US 2019/0193765 A1      Jun. 27, 2019

Related U.S. Application Data

(60) Provisional application No. 62/349,364, filed on Jun. 13, 2016.

(51) Int. Cl.
*B61L 27/00* (2006.01)
*G06N 3/12* (2006.01)

(52) U.S. Cl.
CPC ....... *B61L 27/0027* (2013.01); *B61L 27/0005* (2013.01); *B61L 27/0016* (2013.01);
(Continued)

(58) Field of Classification Search
CPC ............. B61L 27/0027; B61L 27/0055; B61L 27/0016; B61L 27/0005; B61L 27/0077; G06N 3/126
See application file for complete search history.

(56) References Cited

U.S. PATENT DOCUMENTS

| | | | | |
|---|---|---|---|---|
| 2008/0065282 | A1* | 3/2008 | Daum | B61L 27/0027 701/19 |
| 2008/0154452 | A1* | 6/2008 | Kapp | B61L 27/0027 701/20 |
| 2016/0009304 | A1* | 1/2016 | Kumar | B61L 27/0077 701/19 |

OTHER PUBLICATIONS

Salim v et al: "Scheduling cargo trains using genetic algorithms" Evo luti ona ry Computation, 1995., IEEE International Conference on Perth, WA, Australia Nov. 29-Dec. 1, 1995, New York, NY, USA, IEEE, us, Nov. 29, 1995 (Nov. 29, 1995), p. 224, XP032263023, DOI: 10.1109/ICEC.1995.489149 / Jan. 12, 1995.

(Continued)

*Primary Examiner* — Marthe Y Marc-Coleman

(57) ABSTRACT

A method (600) for generating schedules for railroad vehicles travelling within a railroad network using a genetic algorithm (GA) (100), through operation of at least one processor (82), includes providing an initial population (200) of initial schedules (220), each schedule (220) having first information of a railroad track network and second information of railroad vehicles travelling in the railroad track network for a specific time instance, selecting multiple schedules of the initial schedules (220), and generating a final population (480) of final schedules (420) utilizing crossover operation (400) between selected initial schedules (220), wherein the second information of the railroad vehicles travelling in the railroad track network are exchanged between the selected initial schedules (220).

12 Claims, 4 Drawing Sheets

(52) U.S. Cl.
CPC ....... *B61L 27/0055* (2013.01); *B61L 27/0077* (2013.01); *G06N 3/126* (2013.01)

(56) References Cited

OTHER PUBLICATIONS

Omid Gholami et al: "Train routing and timetabling via a genetic algorithm", Proceedings of the 14th IFAC Symposium on Information Control Problems in Manufacturing, vol. 45, Feb. 25, 2012 (Feb. 25, 2012), pp. 158-163, XP055395200, / Feb. 25, 2012.
Barman Rahul et al: "Automated train scheduling system using Genetic Algorithm", 2015 International Symposium on Advanced Computing and Communication (ISACC), IEEE, Sep. 14, 2015 (Sep. 14, 2015), pp. 28-33, XP032841998, DOI: 10.1109/ISACC.2015.7377310 / Sep. 14, 2015.
PCT International Search Report and Written Opinion of International Searching Authority dated Aug. 10, 2017 corresponding to PCT International Application No. PCT/US2017/032581 filed May 15, 2017.

* cited by examiner

METHOD AND SYSTEM FOR TRAIN ROUTE OPTIMIZATION

CROSS REFERENCE TO RELATED APPLICATIONS

This Application is the U.S. National Stage of International Application No. PCT/US2017/032581 filed 15 May 2017 which claims benefit of U.S. Provisional Patent Application No. 62/349,364 filed 13 Jun. 2016 in the United States Patent and Trademark Office, the contents of which are herein incorporated by reference in their entirety.

BACKGROUND

1. Field

Aspects of the present invention generally relate to a method and a system for train route optimization.

2. Description of the Related Art

Railroad transportation systems, in particular freight transportation systems, are becoming more competitive and railroad transportation system operators are looking for ways to optimize track usage. This has led to for example in an increase in number of railroad vehicles (trains) and/or length(s) of railroad vehicles within a railroad track network. Further, the railroad vehicles must be scheduled and routed through the track network based on for example a schedule, which can be very complex due to a large track network and a large number of railroad vehicles.

Many known methods for train scheduling focus on creating static train schedules that are created months or years in advance, focusing on strategic and tactical stages of a rail planning model. However, when these schedules fail in an operational stage, for example when a train is delayed due to various reasons, routing trains that have conflicts on a route through the track network are manually resolved by operator(s) with knowledge gained over time and understanding of the track network. The operator(s) have a complex understanding of the local train-network and are able to formulate mitigation plans that manually remove delays in the network. However, the mitigation plans may affects other train schedules negatively and extra delays and conflicts arise throughout the whole track network. Further, manual resolution can limit the degree of freedom regarding the specifics of the routes to choose based on different parameters that need to be considered when trains are routed through a network or system. Thus, there exists a need for an improved and optimized (re)scheduling of railroad vehicles in a railroad track network.

SUMMARY

Briefly described, aspects of the present invention relate to a method, a system and a computer readable medium for train route optimization. In particular, the method, system and computer readable medium relate to real-time (re) scheduling of railroad vehicles, for example when an expected event occurs within the track network and the railroad vehicles are late to a station and need to be re-routed. The method, system and computer readable medium can be applied to freight transportation systems but also to passenger transportation systems including a number of railroad vehicles, herein also referred to as trains, within a railroad track network, herein also referred to as track network. The provided method and system are based on evolutionary-based learning techniques, which start with random assumptions and build towards solution sets based on loosely built constraints. An example for such techniques is a genetic algorithm, herein referred to as GA, which is utilized for train route optimization as described herein.

A first aspect of the present invention provides a method for generating schedules for railroad vehicles travelling within a railroad network using a genetic algorithm (GA) comprising, through operation of at least one processor, providing an initial population of initial schedules, each schedule comprising first information of a railroad track network and second information of at least one railroad vehicle travelling in the railroad track network for a time instance, selecting at least two schedules of the initial schedules, and generating a final population of final schedules utilizing crossover operation between selected initial schedules, wherein the second information of the at least one railroad vehicle travelling in the railroad track network are exchanged between the selected initial schedules.

A second aspect of the present invention provides a system for generating schedules for railroad vehicles travelling within a railroad network using a genetic algorithm (GA) comprising at least one processor configured to provide an initial population of initial schedules, each schedule comprising first information of a railroad track network and second information of railroad vehicles travelling in the railroad track network for a specific time instance, to select at least two schedules of the initial schedules, and generate a final population of final schedules utilizing crossover operation between selected initial schedules, wherein the second information of the railroad vehicles travelling in the railroad track network are exchanged between the selected initial schedules.

A third aspect of the present invention provides a non-transitory computer readable medium comprising computer instructions capable of being executed in at least one processor and performing the method of generating schedules for railroad vehicles travelling within a railroad network using a genetic algorithm (GA).

DETAILED DESCRIPTION

To facilitate an understanding of embodiments, principles, and features of the present invention, they are explained hereinafter with reference to implementation in illustrative embodiments. In particular, they are described in the context of being a method, a system and a computer readable medium for train route optimization, for example for a freight transportation system. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
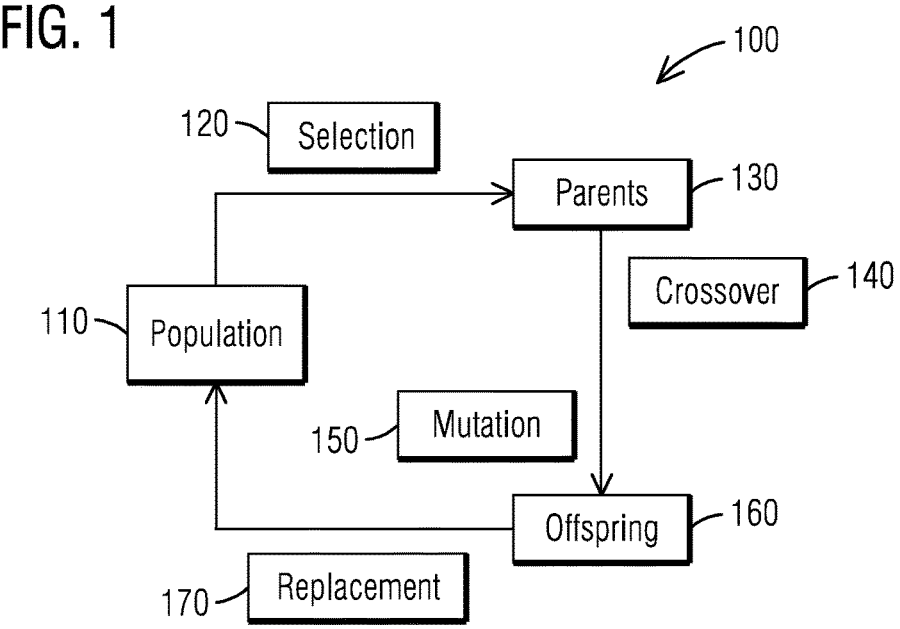
FIG. 1 illustrates a graphical representation of an iteration of a genetic algorithm in accordance with embodiments described herein.

FIG. 1 illustrates a graphical representation of an iteration of a genetic algorithm 100 in accordance with embodiments described herein.

Route optimization, in particular train route optimization, lends well to a form of self-learning problem utilizing a genetic algorithm (GA) which can look at a problem holistically and consider different constraints to learn a best route for many trains through a track network. A GA, compared to other classes of evolutionary algorithms (EA), provides simplicity and ease of transformation which allow for implementations that create robust representations of structures to be optimized. Genetic algorithms are commonly used to generate high-quality solutions to optimization and search problems by relying on bio-inspired operators such as mutation, crossover and selection.

The GA 100 usually starts from a population 110 of randomly generated individuals or members, and is an iterative process, wherein the population 110 of each iteration is called a generation. The population 110 of individuals or members encodes candidate solutions to an optimization problem, which then evolve to create better solutions.

In each generation, fitness of every individual or member in the population 110 can be evaluated using a fitness function. The fitness function is usually related to an objective function in the optimization problem being solved. During a selection 120, the more fit individuals or members are selected, for example stochastically, from the current population 110, and are prime candidates for parents 130. The parents 130 are then reproduced by applying reproduction operators such as crossover 140 and/or mutation 150, to create a set of children, an offspring 160. The offspring 160 replaces the current population 110, see replacement 170, and are used in a next iteration of the GA 100. Commonly, the GA 100 terminates when either a maximum number of generations has been produced, or a satisfactory fitness level has been reached for the population 110.

Figure 2:
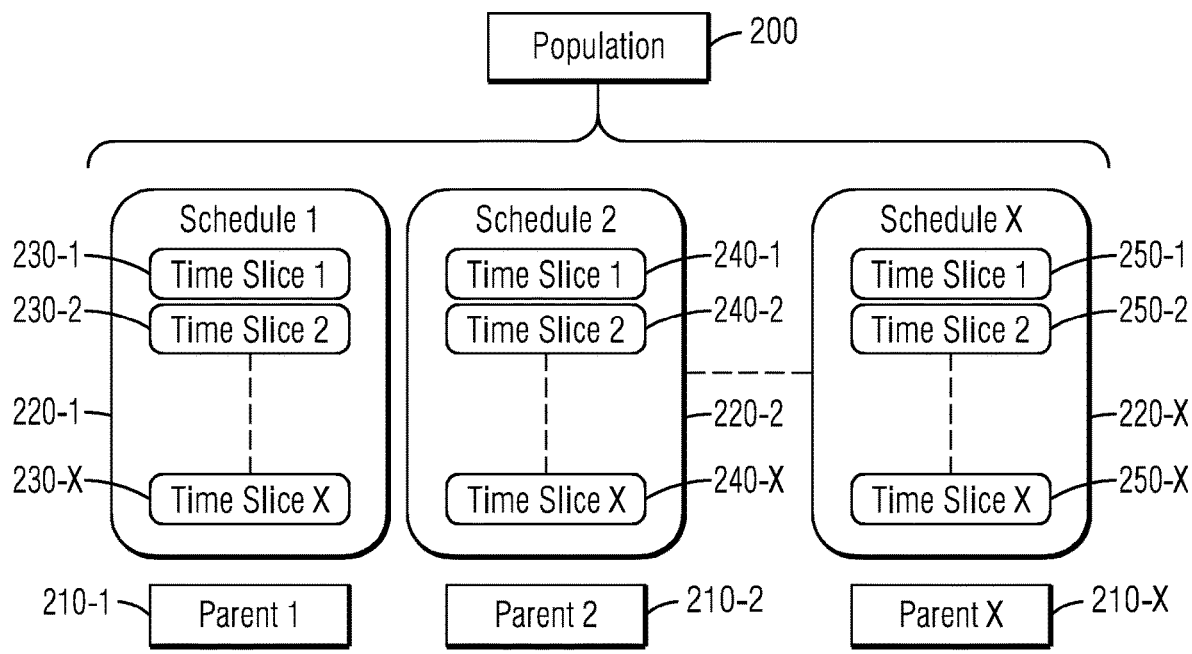
FIG. 2 illustrates a graphical representation of a population of a genetic algorithm in accordance with an exemplary embodiment of the present invention.

FIG. 2 illustrates a graphical representation of a population of a genetic algorithm in accordance with an exemplary embodiment of the present invention.

In accordance with embodiments described herein, a GA, as described for example in FIG. 1, is utilized for train route optimization, wherein an objective of the GA can be to find or generate an optimized schedule that can route all trains of the schedule from a defined source station to a defined destination station in a track network as fast as possible and without collision(s) of one or more trains within the track network.

As described before, a GA starts from an initial population, wherein FIG. 2 illustrates an initial population 200. The population 200 comprises a plurality of individuals, herein referred to as parents. The population 200 comprises a plurality of parents, for example Parent1 210-1, Parent2 210-2 and ParentX 210-X. The initial population 200 is for example generated randomly by a computer and should allow a large range of possible solutions. The parents 210-1, 210-2, 210-X encode possible solutions to the objective of the GA, i.e. each parent 210-1, 210-2, 210-X encodes one possible solution, which then evolve to create better solutions. A population size depends on the nature of the objective or problem to be solved, and it is common practice for users to make an educated guess as to a suitable population size.

In an exemplary embodiment, each parent 210-1, 210-2, 210-X is configured as a schedule 220-1, 220-2, 220-X for routing railway vehicles through a track network. Parent1 is configured as Schedule1 220-1, Parent2 as Schedule2 220-2 and ParentX as ScheduleX 220-X. Each schedule 220-1, 220-2, 220-X comprises information and/or data of the track network and information and/or data of the railroad vehicles travelling within the track network.

In order to represent the information and/or data of the track network and the railroad vehicles travelling within the track network, each schedule 220-1, 220-2, 220-X comprises a plurality of time slices 230, 240, 250, wherein each time slice 230, 240, 250 represents a particular track segment or block, station or switch with different parameters for one time instance or one point in time. In FIG. 2, Schedule1 220-1 includes time slices 230-1, 230-2, 230-X, Schedule2 includes time slices 240-1, 240-2, 240-X, and ScheduleX includes time slices 250-1, 250-2, 250-X. Each schedule 220-1, 220-2, 220-X comprises one or more time slices, and can comprise any desired number of time slices 230, 240, 250. The more time slices 230, 240, 250 in a schedule, the more detailed information and/or data is provided and the greater the search space of the population 200. The provided structure of time slices 230, 240, 250 is limitless, thereby not only allowing extra degrees of freedom in creating unique routes for the railway vehicles, but also creating a vast search space. Although the schedules 220-1, 220-2, 220-X can comprise any number of time slices 230, 240, 250, all the schedules 220-1, 220-2, 220-X can comprise a same number of time slices 230, 240, 250.

In computing environment, a standard representation of each schedule 220, which is a candidate solution, can be as an array of bits. Arrays of other types and structures can be used in essentially the same way. The main property that makes these genetic representations convenient is that their parts are easily aligned due to their fixed size, which facilitates simple crossover operations. Variable length representations may also be used, but crossover implementation is more complex in this case.

Figure 3:
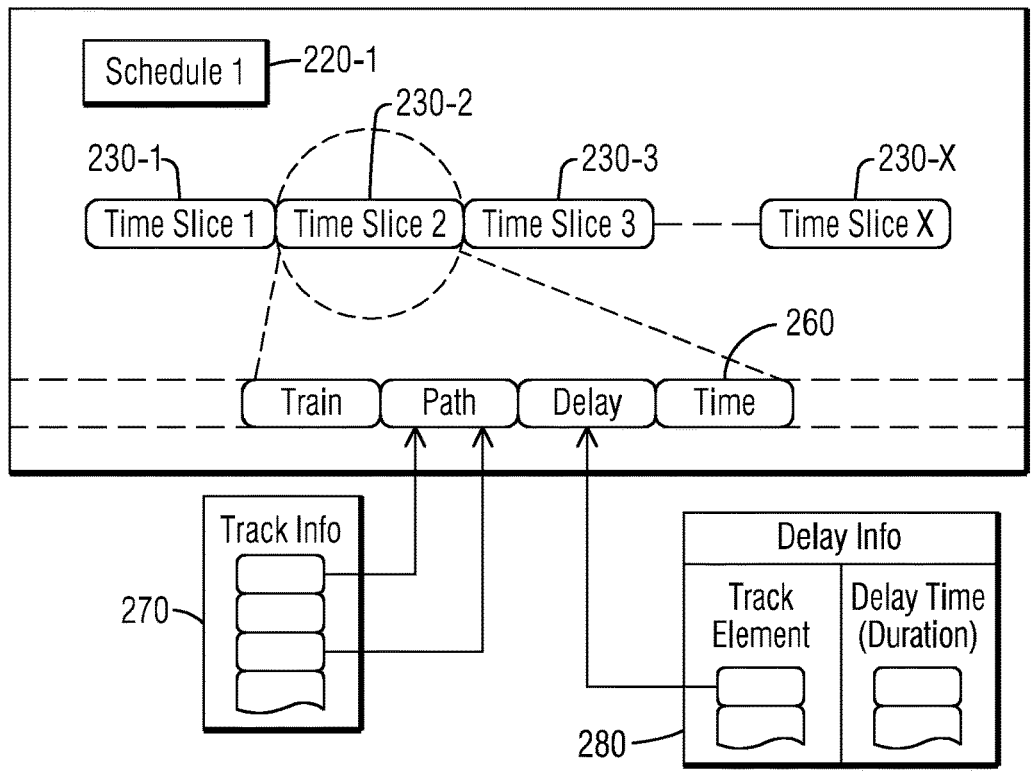
FIG. 3 illustrates a graphical representation of parent of a population of a genetic algorithm in accordance with an exemplary embodiment of the present invention.

FIG. 3 illustrates a graphical representation of a parent of a population of a genetic algorithm in accordance with an exemplary embodiment of the present invention.

As described with reference to FIG. 2, each parent 210-1, 210-2, 210-X is configured as a schedule 220-1, 220-2, 220-X comprising a plurality of time slices 230, 240, 250. FIG. 3 shows details of time slice 230-2 of Schedule1 220-1 of Parent1 210-1. The time slice 230-2 represents a particular track segment or block, station or switch with different parameters for one time instance or point in time. The time slice 230-2 includes information and/or data of the track network and information and/or data of the railway vehicles travelling within the track network for the one time instance. The information of the track network and railway vehicles is structured and represented in each time slice based on a common scheme or structure for all the time slices 230, 240, 250. The time slices 230, 240, 250 represent the genetic material or DNA material of each parent 210-1, 210-2, 210-X.

A track segment or block as described herein is a section of railroad track between two fixed points. The track segment or block usually start and end at selected stations. Lengths of blocks are designed to allow trains to operate as frequently as necessary. A lightly used line might have blocks many kilometres long, but a busy commuter line might have blocks a few hundred metres long. A station as described herein is railroad facility where trains stop to load or unload freight or passengers. A railroad switch as described herein is a mechanical installation enabling trains to be guided from one track to another, such as at a railroad junction or where a spur or siding branches off.

The information and/or data of the time slice 230-2 (and each other time slice) is structured using parameters and can comprise multiple parameters 260. According to FIG. 3, the parameters 260 can comprise for example "Train", "Path", "Delay", "Time" etc. Parameter "Train" includes characteristics of railway vehicles (trains) and can include for example train name, train length, train speed etc. Parameter "Path" includes characteristics of the particular track segment or block, station or switch and can include for example track name, track length, track occupied/unoccupied etc. Parameter "Delay" refers to delays of railway vehicles, and parameter "Time" refers to the time of the particular time slice. As noted before, each time slice 230, 240, 250 represents a particular track segment or block, station or switch with different parameters 260 for one time instance. For example, time slice 230-2 may comprise the parameters 260 for the point in time at 08:05 am, wherein train X is travelling on track block A and has a delay time of three minutes. Some of the parameters 260 of the time slice 230-2 are track related, while some other parameters 260 are train related. Track related parameters are for example "Path". Train related parameters are for example "Train" and "Delay".

A structure or granularity of each time slice 230, 240, 250 can be as fine and detailed as needed and/or according to specific requirements. In other words, each time slice 230, 240, 250 can comprise as many parameters 260 or details as desired. Further, there can be as many time slices 230, 240, 250 as desired by 'slicing' time as desired, for example in minutes or seconds. Certain parameters 260, for example "Path" and "Delay" can be provided or communicated from a source, for example a remote source, in real-time, for example from a wayside control system of the track network and is presented in FIG. 3 as "Track Info" 270 and "Delay Info" 280. The data for "Track Info" 270 and "Delay Info" 280 can be fed into the schedules 220 in order to provide real-time and accurate information. The modelling of the contents of the schedules in time slices 230, 240, 250 is to optimize in time. Further, the time slices 230, 240, 250 allow an extra degree of freedom and larger search space.

In a further exemplary embodiment, different parameters 260 of a time slice 230, 240, 250 can be given different weights. Thereby, specific parameters 260 can be prioritized over other parameters 260. For example, train related parameters may be given a greater weight than track related parameters.

Figure 4:
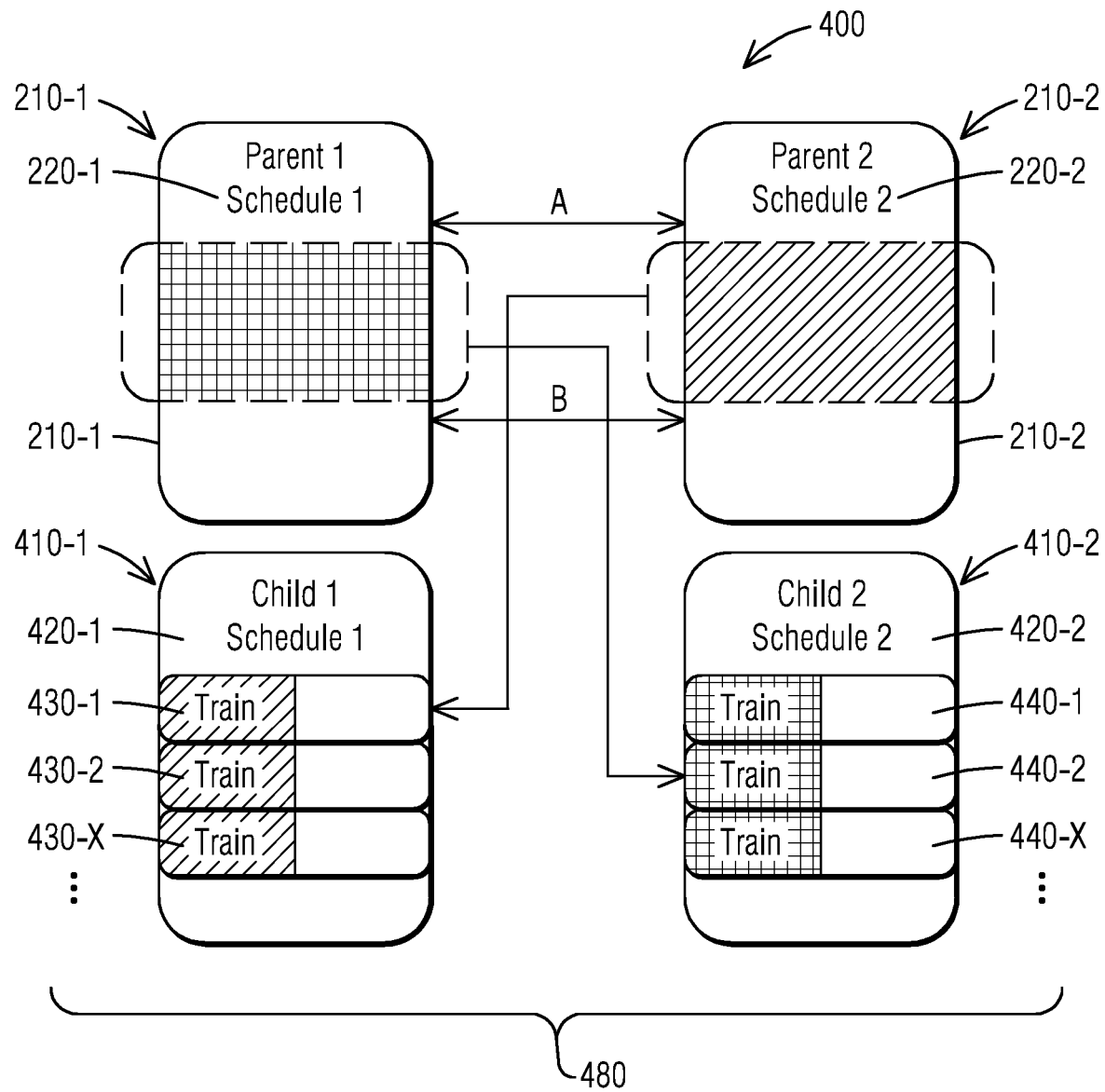
FIG. 4 illustrates a graphical representation of a crossover operation of parents of a population in accordance with an exemplary embodiment of the present invention.

FIG. 4 illustrates a graphical representation of a crossover operation of parents of a population in accordance with an exemplary embodiment of the present invention. The crossover operation is one of most closely related functions of biological representation, and considered to be the most import operation in GAs. Crossover is defined as the occurrence of when two parents exchange parts of their respective chromosomes. This produces offspring that theoretically should benefit from the bit combinations of both parents.

As described with reference to FIG. 1 and FIG. 2, after the initial population 200 has been created, at least two of the initial schedules 220 (parents 210) are selected. Such a selection can be random; however biasing or weighting guarantees a probability that a parent 210 with a bias (or higher fitness value) is chosen over another parent 210. An example for a selection technique is the Roulette Wheel. This selection technique will not be described in detail herein, as one of ordinary skill in the art is familiar with this technique.

Alternatively, before selecting parents 210 out of the population 200, a fitness of every parent 210 in the population 200 can be evaluated, i.e. each parent 210 is assigned a fitness value. Fitness can be evaluated using a fitness function which is usually related to the objective function in the optimization problem being solved. As described before, an objective of the optimization problem can be to find or generate an optimized schedule that can route all trains of the schedule from a defined source station to a defined destination station in the track network as fast as possible and without collision(s) of one or more trains within the track network. In accordance with such an objective, the parents 210, i.e. the schedules 220, are evaluated and assigned respective fitness values. There are known methods and processes for designing a fitness function or assigning fitness values and thus will not described herein in detail. During the selection 120, the more fit parents 210 of the population are selected for reproducing by applying reproduction operators such as crossover 140 and/or mutation 150, to create a set of children, the offspring 160.

FIG. 4 illustrates a crossover operation 400 of Parent1 210-1 and Parent2 210-2 creating one or more children 410, specifically Child1 410-1 and Child2 410-2. Of course, more or less than two children 410 can be created by the crossover operation 400. As the parents 210-1, 210-2 are configured as schedules 220-1, 220-1 with time slices, so is each child 410-1, 410-2 configured as a schedule 420 comprising multiple time slices 430. Child1 410-1 is configured as Schedule1 420-1 and Child2 is configured as Schedule2 420-2. Schedule1 420-1 comprises multiple time slices 430-1, 430-2, 430-X and Schedule2 comprises multiple time slices 440-1, 440-2, 440-X.

In accordance with an exemplary embodiment, the crossover operation 400 can include one-point crossover and/or two-point crossover. In a one-point crossover, a random point along the parent is chosen, resulting in the division of the parent at that particular point. The children are the combination of the divided parts of the parents. However, one point crossover can drastically change the genetic makeup of the parent and therefore negatively impact fitness of the parent. Thus, a two-point crossover is proposed. Once again, random points are chosen, but this time two points A and B along the parents 210-1, 210-2 (schedules 220-1, 220-2) are chosen and segments situated in between the crossover points A and B are exchanged, which produce the new children 410-1, 410-2. The enhancement that is achieved from such a controlled crossover operation 400 is that certain positive aspects from the parents 210-1, 210-2 can be translated over to the children 410-1, 410-2, but also giving the children 410-1, 410-2 some unique aspects of their own.

In the crossover operation 400, one or more selected time slices between crossover points A and B of the parents are exchanged. The time slices between points A and B of the parents 210-1, 210-2 are considered for crossover. One or more time slices 230, 240 can be considered for the crossover operation 400. FIG. 4 illustrates that three time slices are chosen for crossover, wherein information and/or data of some or all parameters 260 of the time slices 230, 240 between points A and B then form time slices 430, 440 of the children 410-1, 410-2.

According to FIG. 4, three time slices are exchanged, wherein Child1 410-1 comprises time slices 430-1, 430-2, 430-X originating from Parent2 210-2. Child2 410-2 comprises time slices 440-1, 440-2, 440-X which originate from Parent1 210-1. In an embodiment, whole or complete time slices of the parents 210-1, 210-2 are exchanged (herein referred to as a "full crossover"). In another embodiment, the crossover operation 400 incorporates optimization for train collision by only selectively exchanging genetic material (i.e. parameters 260) when routes do not match. In order to alleviate train collisions, only train related content of parameters 260 of the considered time slices between points A and B are exchanged and swapped to the children 410, wherein track related content remain in the time slices of the parents and are not exchanged (herein referred to as "partial crossover"). This is illustrated in FIG. 4, where only train related information (designated "Train") has been exchanged and swapped to the children as illustrated within the time slices 430, 440 of the children. The children 410 represent a final population 480 including optimized schedules 420 of train routes.

Figure 5:
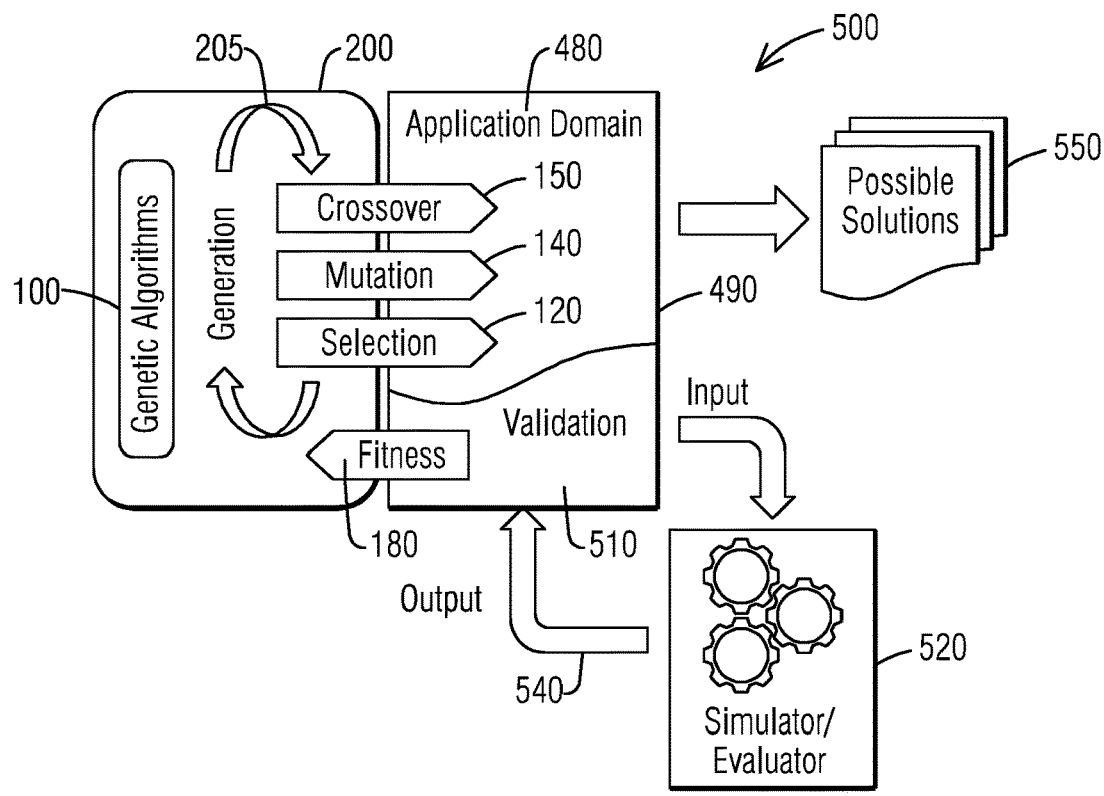
FIG. 5 illustrates a graphic illustration of an optimization system including a genetic algorithm in accordance with an exemplary embodiment of the present invention.

FIG. 5 illustrates a graphic illustration of an optimization system including a genetic algorithm in accordance with an exemplary embodiment of the present invention.

Optimization system 500 comprises the initial population 200 with multiple parents configured as schedules. The initial population 200 as well as any further population is considered as a generation 205. During an iteration of the GA 100 using selection 120, mutation 140 and/or crossover 150, the final population 480, for example within an application domain 490, is created.

In an exemplary embodiment, the optimization system 500 provides isolation between the GA 100 and the specific application of the application domain 490, in our case the train route optimization. A validation 510 abstracts away type and number of simulators (mutation 140, crossover 150, and selection 120) that were used to influence a fitness function of the GA 100, allowing experimentation with different simulators/evaluators. Validation 510 and/or simulation of the final population 480 can be performed using a simulator/evaluator tool 520. Generated final population 480 provides input 530 to the simulator tool 520, and performed validation and/or simulation results are provided as output 540, for example to determine fitness 180 of each schedule of the final population 480. The system 500 generates a best solution for each iteration for diagnostic purposes to possibly observe paths that the GA 100 took to reach final possible solutions 550.

Figure 6:
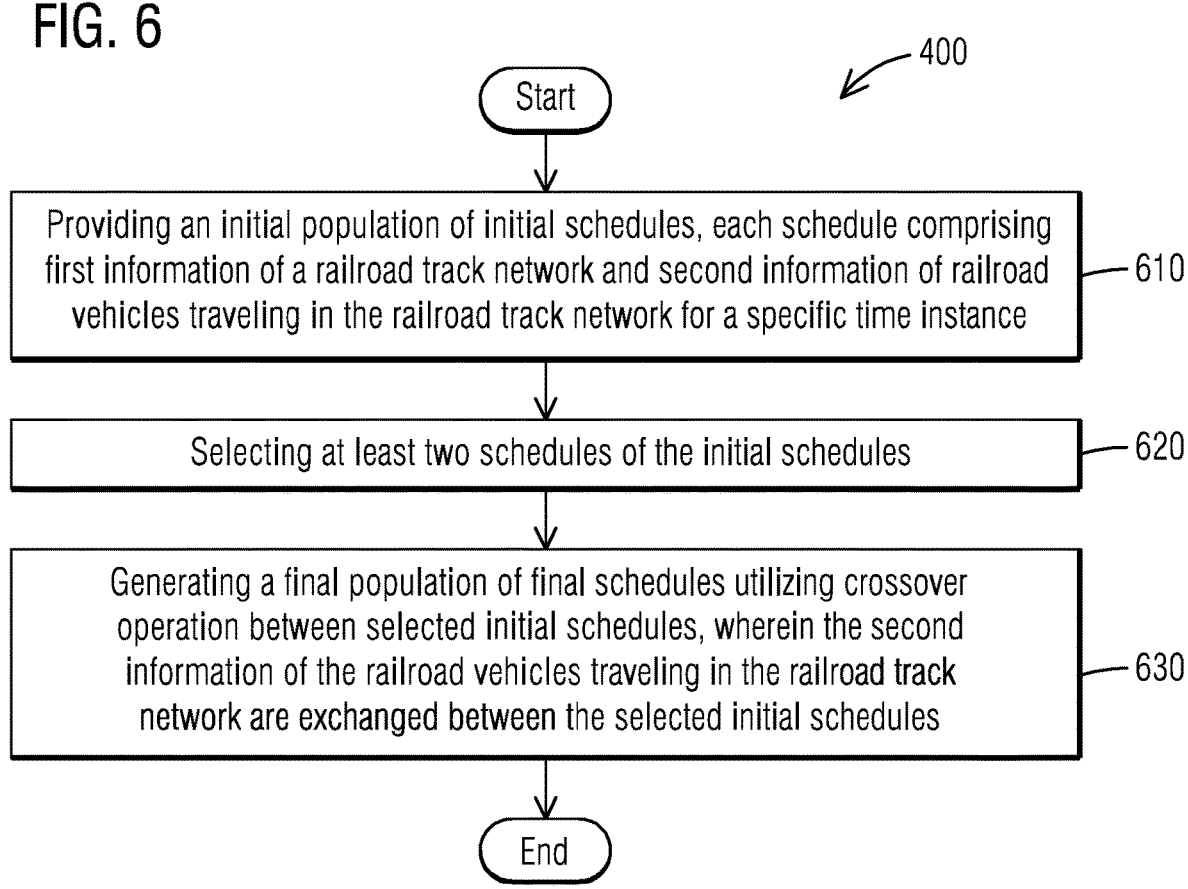
FIG. 6 illustrates a flow chart of a method for generating schedules for railroad vehicles travelling within a railroad network using a genetic algorithm in accordance with an exemplary embodiment of the present invention.

FIG. 6 illustrates a flow chart of a method for generating schedules for railroad vehicles travelling within a railroad network using a genetic algorithm in accordance with an exemplary embodiment of the present invention. Summarizing, a method 600 for generating schedules for railroad vehicles travelling within a railroad network using a GA is provided. The method 600 comprises, in step 610, providing an initial population of initial schedules, wherein each schedule comprises first information of a railroad track network and second information of railroad vehicles travelling in the railroad track network for a specific time instance. In step 620, at least two schedules of the initial schedules are selected. In step 630, a final population of final schedules is generated utilizing crossover operation between selected initial schedules, wherein the second information of the railroad vehicles travelling in the railroad track network are exchanged between the selected initial schedules.

Figure 7:
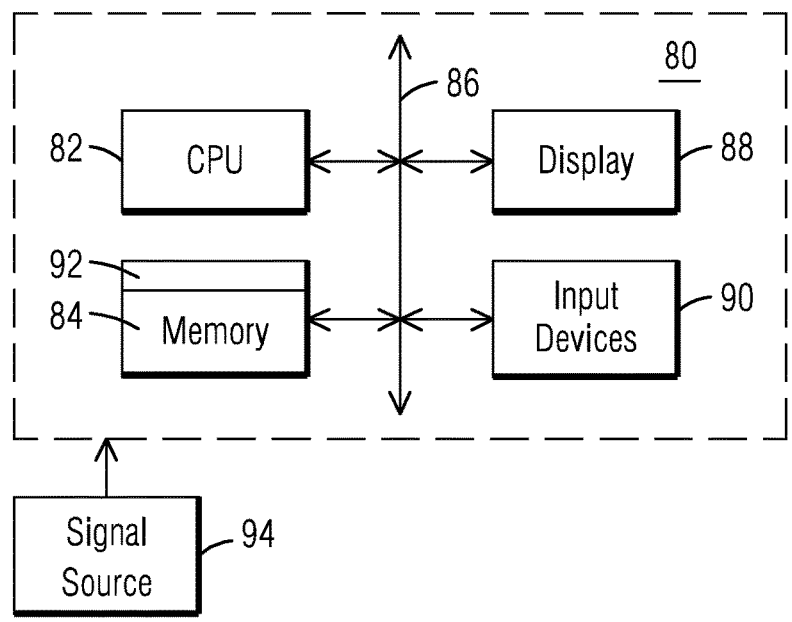
FIG. 7 illustrates a high level block diagram of a computer for implementing the described method and system in accordance with an exemplary embodiment of the present invention.

FIG. 7 illustrates a high level block diagram of a computer for implementing the described method and system in accordance with an exemplary embodiment of the present invention.

The described method and system for train route optimization may be implemented by using a computer 80. The computer 80 includes software and drivers for performing the method for train route optimization. The computer 80 may use well-known computer processors, memory units, storage devices, computer software, and other components. Computer 80 may include a central processing unit (CPU) 82, a memory 84 and an input/output (I/O) interface 86. The computer 80 is generally coupled through the I/O interface 86 to a display 88 for visualization and various input devices 90 that enable user interaction with the computer 80 such as a keyboard, keypad, touchpad, touchscreen, mouse, speakers, buttons or any combination thereof. Support circuits may include circuits such as cache, power supplies, clock circuits, and a communications bus. The memory 84 may include random access memory (RAM), read only memory (ROM), disk drive, tape drive, etc., or a combination thereof. Embodiments of the present disclosure may be implemented as a routine 92 that is stored in memory 84 and executed by the CPU 82 to process the signal from a signal source 94. As such, the computer 80 is a general purpose computer system that becomes a specific purpose computer system when executing the routine 92. The computer 80 can communicate with one or more networks such as a local area network (LAN), a general wide area network (WAN), and/or a public network (e.g., the Internet) via a network adapter. One skilled in the art will recognize that an implementation of an actual computer could contain other components as well, and that FIG. & is a high level representation of some of the components of such a computer for illustrative purposes.

The computer 80 also includes an operating system and micro-instruction code. The various processes and functions described herein may either be part of the micro-instruction code or part of the application program, or a combination thereof, which is executed via the operating system. In addition, various other peripheral devices may be connected to the computer platform such as an additional data storage device and a printing device. Examples of well-known computing systems, environments, and/or configurations that may be suitable for use with computer 80 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The method and system of the figures are not exclusive. Other systems, processes and menus may be derived in accordance with the principles of the present invention to accomplish the same objectives. Although the present invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

The invention claimed is:

1. A method for generating schedules for railroad vehicles travelling within a railroad network using a genetic algorithm (GA) comprising, through operation of at least one processor:
    providing an initial population of initial schedules, each schedule comprising first information of a railroad track network and second information of at least one railroad vehicle travelling in the railroad track network for a time instance,
    selecting at least two schedules of the initial schedules, and
    generating a final population of final schedules utilizing crossover operation between selected initial schedules, wherein the second information of the at least one railroad vehicle travelling in the railroad track network are exchanged between the selected initial schedules,
    wherein each schedule comprises a plurality of time slices,
    wherein each time slice comprises the first information and represents a railroad block, station or switch of the railroad track network for the time instance, and
    wherein each time slice comprises the second information of the at least one railroad vehicle travelling in the railroad network, the second information including one or more parameters comprising identification of the at least one railroad vehicle, train name, train speed, train length, travelling time or delay time, train priority.

2. The method of claim 1, wherein the second information are exchanged without exchanging the first information of the railroad track network for the time instance.

3. The method of claim 1, wherein the first information of the railroad track network includes one or more parameters comprising identification of track component, track name, track length, track occupied/unoccupied, or cost of track usage.

4. The method of claim 1, wherein the crossover operation is performed between two selected initial schedules and is configured as two-point crossover operation, wherein parameters of time slices between at least two points are exchanged.

5. The method of claim 1, further comprising:
    simulating and validating generated final schedules of the final population utilizing a simulator/evaluator tool.

6. The method of claim 1, wherein the initial population comprises at least one schedule with delays of one or more railroad vehicles travelling within the railroad track network.

7. A non-transitory computer readable medium comprising computer instructions capable of being executed in at least one processor and performing the method as claimed in claim 1.

8. A system for generating schedules for railroad vehicles travelling within a railroad network using a genetic algorithm comprising:
    at least one processor configured to:
        provide an initial population of initial schedules, each schedule comprising first information of a railroad track network and second information of railroad vehicles travelling in the railroad track network for a time instance,
        select at least two schedules of the initial schedules, and
        generate a final population of final schedules utilizing crossover operation between selected initial schedules, wherein the second information of the railroad vehicles travelling in the railroad track network are exchanged between the selected initial schedules,
    wherein each schedule comprises a plurality of time slices,
    wherein each time slice comprises the first information and represents a railroad block, station or switch of the railroad track network for the time instance, and
    wherein each time slice comprises the second information of the at least one railroad vehicle travelling in the railroad network, the second information including one or more parameters comprising identification of the at least one railroad vehicle, train name, train speed, train length, travelling time or delay time, train priority.

9. The system of claim 8, wherein the first information of the railroad track network includes one or more parameters comprising identification of track component, track name, track length, track occupied/unoccupied, or cost of track usage.

10. The system of claim 9, wherein each initial schedule and each final schedule comprises a plurality of time slices, each time slice representing a railroad block, station or switch of the railroad track network for the time instance, and each time slice comprising one or more parameters.

11. The system of claim 10, wherein the at least one controller is configured to perform the crossover operation between two selected initial schedules as two-point crossover operation, wherein one or more parameters of time slices between at least two points are exchanged.

12. The system of claim 8, wherein the at least one controller is configured to simulate and/or evaluate generated final schedules of the final population.

* * * * *